May 16, 1967  A. C. COLLIN ETAL  3,319,910
COMBINATION FISHING ROD CARRIER, HOLDER, AND
DISPLAY HANGER
Filed May 17, 1966

ARTHUR CARL COLLIN
VIOLA ROSE COLLIN
*INVENTORS*

BY *James D. Girnan*
ATT'Y

United States Patent Office 3,319,910
Patented May 16, 1967

3,319,910
COMBINATION FISHING ROD CARRIER, HOLDER, AND DISPLAY HANGER
Arthur Carl Collin and Viola Rose Collin, both of 372 W. Oak St., Lebanon, Oreg. 97355
Filed May 17, 1966, Ser. No. 551,850
5 Claims. (Cl. 248—40)

The principal object of the present invention is to provide simple and effective means for reassembling disjointed sections of a fishing pole in parallel relation to each other in compact form for convenience in handling, storing and the like, and also to overcome the risk of damage from snagging entanglement incident to travelling through wooded areas such as from one fishing area to another. Another feature of the invention resides in providing the device with means for displaying the pole components by suspension from a supporting wall or rack.

Figure 1:
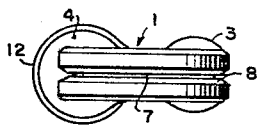
Figure 2:
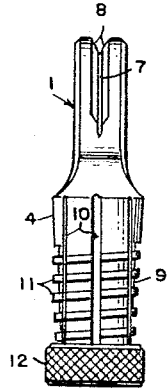
Figure 3:
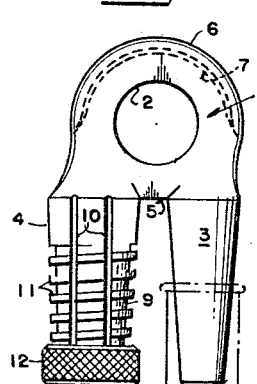
Figure 4:
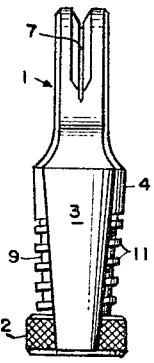
Figure 5:
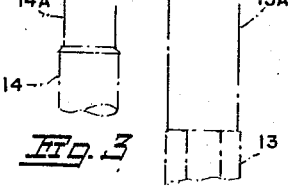
Figure 6:
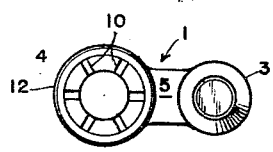
Figure 7:
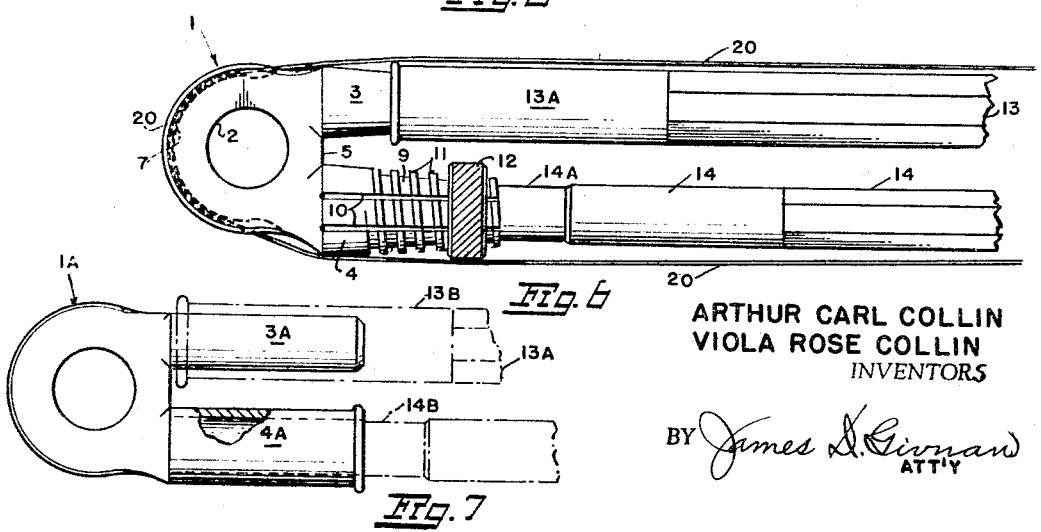

The foregoing and other objects will appear as the invention is more fully hereinafter described and claimed, reference being had to the accompanying drawing forming a part hereof and in which FIGURE 1 is a top view of a fish pole holding device made in accordance with our invention; FIG. 2 is a view of the left side of the device; FIG. 3 is a front elevational view of the device; FIG. 4 is a view of the right side thereof; FIG. 5 is a bottom view of FIGURE 3; FIGURE 6 is a view of the device rotated from its FIG. 3 position through 90 degrees and illustrating two sections of a fishing pole removably secured thereto, and FIGURE 7 is a view similar to FIGURE 6 showing a modified form of the invention.

With continuing reference to the drawing wherein like reference numerals designate like parts, reference numeral 1 indicates generally the main body of the device which is preferably, though not restrictively, made of cast metal with an opening 2 therethrough and bifurcated as shown to provide two outwardly extending arms 3 and 4 arranged parallel to each other to provide a space 5 therebetween, for a purpose hereinafter pointed out. The rounded top end 6 of the body member 1 is provided with a groove 7 having upwardly and outwardly diverging side walls 8 whose purpose will also be hereinafter more fully pointed out.

The arm 3 is of solid formation and tapered throughout its length as shown. The arm 4 is of hollow construction throughout its length and divided into externally threaded clamping fingers 9 by diametrically opposed slots 10 and provided with a knurled nut 12.

In FIGURES 3 and 6, one section of a fishing pole is indicated at 13 and another at 14.

In attaching sections of a fishing pole, for example section 13, to the device, the tapered arm 3 is thrust into wedged engagement with the interior of the usual openended hollow ferrule 13A at the end of that pole section. The usual solid or hollow ferrule 14A of the companion pole section 14, when inserted into the hollow arm 4 and surrounded by the spring fingers 9, will be securely gripped thereby upon advancing the nut 12 along the threads 11 of the fingers.

In the modification shown in FIGURE 7, the solid arm 3A of the device is of uniform diameter throughout its length substantially matching the inside diameter of the hollow ferrule 13B of pole section 13A for firm frictional, telescopic engagement therewith. The companion arm 4A is of hollow tubular form of uniform inside diameter substantially matching the outside diameter of the end portion of the ferrule 14B on the pole section 14 for telescopic frictional interengagement therewith.

From the foregoing it will be readily apparent that disjointed fishing pole sections can be reassembled and held in parallel relation to each other for transportation, storage or display purposes in compact form and of a length equal to that of only one section. In addition thereto, a fishing line 20 payed out from a reel attached to the end (not shown) of one section and extending to the tip end (not shown) of a companion section will also be held against displacement by being entrained over the rounded end 6 of the main body 1 within the groove 7. With the line so attached any tension applied to it by one or two turns of the fishing reel will contribute to the holding power of the frictional engagement of the ferrules on the ends of the pole sections with their respective arms 3 and 4 of the device.

The device with the pole sections attached can be suspended as shown in FIGURE 3 from a wall or other vertical supporting surface by a protruding fastening element extending either through the opening 2 of the main body 1 or the flat bottom portion 5 thereof between the arms 3 and 4.

While we have shown particular forms of embodiment of our invention, we are aware that many minor changes therein will readily suggest themselves to others skilled in the art without departing from the spirit and scope of the invention. Having thus described our invention, what we claim as new and desire to protect by Letters Patent is:

We claim:
1. A holder for sections of a fishing pole comprising a main body member,
at least two arms carried by the body member and extending outwardly therefrom in parallel relation to each other,
one of said arms adapted for telescopic frictional engagement with the interior of an open ended ferrule at one end of one of said fishing pole sections, and
the other of said arms of hollow tubular form adapted for telescopic engagement with the exterior of a ferrule at one end of another of said fishing pole sections.
2. A holder for sections of a fishing pole is claimed in claim 1 wherein said body member and said arms are an integral unit,
one of said arms tapering throughout its length and the other arm of hollow tubular form divided by longitudinal slots into flexible fingers, and
means movable lengthwise of said fingers for compressing the same into gripping engagement with a ferrule at the end of said another of said fishing pole sections.
3. A holder for sections of a fishing pole as claimed in claim 1 wherein said body member has an opening therethrough for suspending the device from a support.
4. A holder for sections of a fishing pole as claimed in claim 1 wherein the spacing between said arm members at the inner ends thereof provides means for suspending the device from a support.
5. A holder for sections of a fishing pole as claimed in claim 1 wherein said body member has a semi-circular end portion and an outwardly opening groove thereabout adapted to receive and hold a fishing line carried by the fishing pole sections when attached to said arms.

References Cited by the Examiner
UNITED STATES PATENTS

| 208,965 | 10/1878 | Crowell | 287—116 |
| 682,269 | 9/1901 | Poe | 248—79 X |
| 1,328,612 | 1/1920 | Becker | 287—116 |
| 1,707,353 | 4/1929 | Fraser | 287—53 |

CLAUDE A. LE ROY, *Primary Examiner.*